Figure 1:
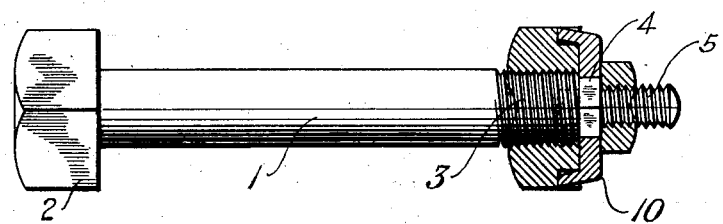

J. STEELE.
NUT LOCKING DEVICE.
APPLICATION FILED MAY 22, 1911.

1,021,559.

Patented Mar. 26, 1912.

WITNESSES:

INVENTOR.
J. STEELE.
BY
ATTORNEYS.

UNITED STATES PATENT OFFICE.

JAMES STEELE, OF BROOKVILLE, PENNSYLVANIA.

NUT-LOCKING DEVICE.

1,021,559. Specification of Letters Patent. Patented Mar. 26, 1912.

Application filed May 22, 1911. Serial No. 628,614.

*To all whom it may concern:*

Be it known that I, JAMES STEELE, a citizen of the United States of America, residing at Brookville, in the county of Jefferson and State of Pennsylvania, have invented certain new and useful Improvements in Nut-Locking Devices, of which the following is a specification, reference being had therein to the accompanying drawing.

This invention relates to nut locking devices, and the objects of my invention are to provide positive and reliable means, in a manner as will be hereinafter set forth, for locking a nut upon a bolt whereby it cannot become accidentally displaced and to furnish a bolt with a device of the above type that is simple in construction, easy to install and capable of meeting exigencies incident to the uses to which the device may be subjected.

I attain the above objects by a mechanical construction that will be hereinafter specifically described and then claimed, and reference will now be had to the drawing wherein like numerals denote corresponding parts throughout the several views, in which:—

Figure 2:
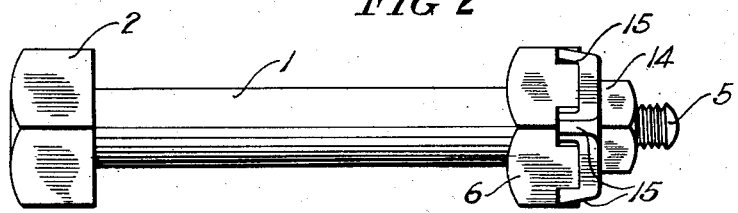
Figure 3:
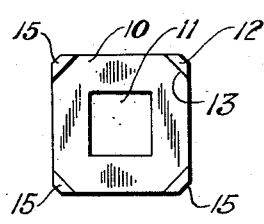
Figure 4:
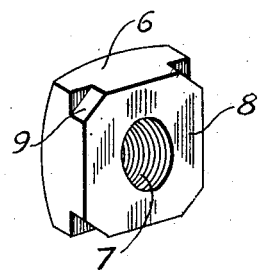

Figure 1 is a longitudinal sectional view of the nut lock in accordance with this invention, Fig. 2 is a plan of the same, Fig. 3 is an end view of a nut locking washer, and Fig. 4 is a perspective view of a nut in accordance with this invention.

The reference numeral 1 denotes a bolt having a head 2 at one end thereof and the opposite end screw threaded, as at 3. The screw threaded end 3 is reduced to provide a rectangular shank 4 and a stem 5, which is also screw threaded. The stem is of a less diameter than the bolt 1, for a purpose that will presently appear.

The reference numeral 6 denotes a nut having a screw threaded bore 7 whereby said nut can be screwed upon the threaded end of the bolt 1. The nut 6 has the outer corners formed by the face 8 and the faces of the nut cut away to form angularly disposed shoulders or recesses 9, the recesses being of a depth approximately one-half the depth of the nut.

The reference numeral 10 denotes a washer having a central rectangular opening 11, whereby it can be fitted upon the rectangular shank 4. The washer 10 has the corners thereof formed by the side edges of the washer provided with rearwardly projecting lugs 12 having flat faces 13 adapted to engage the shoulders 9. After the locking washer 10 has been placed in engagement with the nut 6, a small auxiliary nut 14 can be screwed upon the stem 5 to retain the washer in engagement with the main nut.

The locking washer 10 can be stamped from a single piece of metal and the lugs 12 bent at an angle to the body of the washer, it being preferable to bevel the outer sides of the lugs 12, as at 15 whereby the locking device will not present any sharp edges or corners.

From the foregoing it will be observed that the nut locking device can be advantageously used in connection with rail joints, bridges, rolling stock and structures subjected to jars, agitation and vibration, and while in the drawing there is illustrated a preferred embodiment of the invention, it is to be understood that the structural elements thereof are susceptible to such variations as fall within the scope of the appended claim.

What I claim is:

A nut locking device comprising the combination with a bolt having the threaded portion with the outer terminus thereof reduced to provide a smooth rectangular shank, a threaded stem projecting centrally from said shank and of less diameter than the threaded portion of the bolt, of a nut mounted upon the threaded portion of said bolt and having each outer corner thereof cut away to provide an angularly disposed shoulder extending in a plane intersecting two sides of the nut, a rectangular washer of equal axial length with the length of said rectangular shank and having a rectangular opening with the walls of the latter snugly fitted throughout said shank, inwardly projecting lugs at the corners of said washer and each having an angularly inner face abutting against a shoulder of the nut, and an auxiliary nut mounted upon said stem and bent against the outer face of the washer for retaining the latter and its lugs in engagement with the nut.

In testimony whereof I affix my signature in the presence of two witnesses.

JAMES STEELE.

Witnesses:
C. H. BUTLER,
J. K. ROSS.